(12) United States Patent
Spyrou

(10) Patent No.: US 8,674,050 B2
(45) Date of Patent: Mar. 18, 2014

(54) REACTIVE ISOCYANATE COMPOSITIONS

(75) Inventor: Emmanouil Spyrou, Schermbeck (DE)

(73) Assignee: Evonik Degussa GmbH, Essen (DE)

( * ) Notice: Subject to any disclaimer, the term of this patent is extended or adjusted under 35 U.S.C. 154(b) by 86 days.

(21) Appl. No.: 12/740,818

(22) PCT Filed: Dec. 8, 2008

(86) PCT No.: PCT/EP2008/066996
§ 371 (c)(1),
(2), (4) Date: Apr. 30, 2010

(87) PCT Pub. No.: WO2009/080479
PCT Pub. Date: Jul. 2, 2009

(65) Prior Publication Data
US 2010/0249310 A1    Sep. 30, 2010

(30) Foreign Application Priority Data
Dec. 21, 2007   (DE) .......................... 10 2007 062 316

(51) Int. Cl.
C08G 18/70   (2006.01)

(52) U.S. Cl.
USPC .............................................. 528/51; 528/52

(58) Field of Classification Search
USPC ..................................... 528/51, 52
See application file for complete search history.

(56) References Cited

U.S. PATENT DOCUMENTS

| | | | | |
|---|---|---|---|---|
| 3,980,594 A | * | 9/1976 | Fabris et al. .................. | 521/129 |
| 4,299,924 A | * | 11/1981 | Nomura et al. ............... | 521/131 |
| 4,335,219 A | * | 6/1982 | Clarke et al. .................. | 521/128 |
| 4,698,408 A | * | 10/1987 | Goel et al. ....................... | 528/48 |
| 4,728,676 A | * | 3/1988 | Muller et al. .................. | 521/107 |
| 5,091,496 A | * | 2/1992 | Haseyama et al. ............. | 528/73 |
| 5,124,429 A | * | 6/1992 | Haseyama et al. ............. | 528/73 |
| 5,714,565 A | * | 2/1998 | Nodelman et al. ........... | 528/74.5 |
| 6,914,115 B2 | * | 7/2005 | Spyrou et al. .................. | 528/45 |
| 7,300,997 B2 | | 11/2007 | Wenning et al. | |
| 7,307,135 B2 | * | 12/2007 | Spyrou .......................... | 528/48 |
| 7,572,876 B2 | * | 8/2009 | Spyrou et al. .................. | 528/48 |
| 7,709,589 B2 | * | 5/2010 | Spyrou et al. .................. | 528/45 |
| 2004/0219367 A1 | | 11/2004 | Spyrou et al. | |
| 2005/0096450 A1 | | 5/2005 | Spyrou et al. | |
| 2005/0239956 A1 | | 10/2005 | Spyrou et al. | |
| 2005/0239992 A1 | | 10/2005 | Spyrou et al. | |
| 2007/0197759 A1 | | 8/2007 | Binder et al. | |
| 2007/0218209 A1 | | 9/2007 | Asahina et al. | |
| 2007/0266897 A1 | | 11/2007 | Spyrou | |
| 2007/0282089 A1 | | 12/2007 | Spyrou | |
| 2008/0097025 A1 | * | 4/2008 | Spyrou et al. .................. | 524/590 |
| 2008/0171816 A1 | * | 7/2008 | Spyrou et al. .................. | 524/95 |
| 2008/0214728 A1 | * | 9/2008 | Spyrou et al. .................. | 524/590 |
| 2008/0265201 A1 | * | 10/2008 | Spyrou et al. ................. | 252/8.57 |
| 2010/0168329 A1 | | 7/2010 | Hoppe et al. | |
| 2010/0222540 A1 | | 9/2010 | Raukamp et al. | |
| 2010/0227942 A1 | * | 9/2010 | Spyrou et al. .................. | 522/174 |
| 2010/0263792 A1 | * | 10/2010 | Spyrou et al. ............... | 156/331.4 |
| 2011/0039030 A1 | * | 2/2011 | Spyrou .......................... | 427/389 |
| 2013/0041102 A1 | | 2/2013 | Albrecht et al. | |

FOREIGN PATENT DOCUMENTS

| | | |
|---|---|---|
| DE | 10 2004 011 004 | 9/2005 |
| DE | 10 2004 012 571 | 9/2005 |
| DE | 10 2006 004 077 | 8/2007 |
| EP | 1 721 920 | 11/2006 |
| WO | WO 2006100144 A1 * | 9/2006 |
| WO | WO 2007045615 A1 * | 4/2007 |

OTHER PUBLICATIONS

U.S. Appl. No. 12/990,138, filed Oct. 28, 2010, Spyrou.

\* cited by examiner

*Primary Examiner* — Mike M Dollinger
(74) *Attorney, Agent, or Firm* — Oblon, Spivak, McClelland, Maier & Neustadt, L.L.P.

(57) ABSTRACT

The invention relates to compositions with isocyanate groups, which can be cured without an isocyanate-reactive component, to processes for preparing such compositions and to the use thereof.

28 Claims, No Drawings

REACTIVE ISOCYANATE COMPOSITIONS

The invention relates to compositions with isocyanate groups, which can be cured without an isocyanate-reactive component, to processes for preparing such compositions and to the use thereof.

Externally or internally blocked polyisocyanates constitute valuable crosslinkers for thermally crosslinkable polyurethane (PU) coating and adhesive compositions.

For example, DE-A 27 35 497 describes PU coating materials with outstanding weathering and thermal stability. The crosslinkers whose preparation is described in DE-A 27 12 931 consist of ε-caprolactam-blocked isophorone diisocyanates which contains isocyanurate groups. Also known are polyisocyanates containing urethane, biuret or urea groups, whose isocyanate groups are likewise blocked.

The disadvantage of these externally blocked systems consists in the elimination of the blocking agent during the thermal crosslinking reaction. Since the blocking agent can thus be emitted into the environment, particular precautions for cleaning of waste air and/or recovery of the blocking agent have to be made for ecological and occupational hygiene reasons. In addition, the crosslinkers have a low reactivity. Curing temperatures above 170° C. are required.

DE-A 30 30 539 and DE-A 30 30 572 describe processes for preparing polyaddition compounds containing uretdione groups, whose terminal isocyanate groups are blocked irreversibly with monoalcohols or monoamines. Particularly disadvantageous are the chain-breaking constituents of the crosslinkers, which lead to low network densities of the PU coatings and hence to moderate solvent stabilities.

Polyaddition compounds which are terminated by hydroxyl groups and contain uretdione groups are the subject-matter of EP 669 353. Owing to their functionality of two, they have improved resistance to solvents. What is common to the compositions based on these polyisocyanates containing uretdione groups is that they do not emit any volatile compounds in the curing reaction. However, the baking temperatures of at least 180° C. are at a high level.

In commercial 2K formulations, isocyanate-containing components are mixed and reacted with components reactive toward isocyanate groups. This has the disadvantage that attention has to be paid here to the suitable stoichiometry, which in practice very frequently gives rise to errors in the metered addition or in the calculation. Moreover, in the case of high-reactivity systems, the mixing also has to be optimal, which means an increased level of apparatus complexity.

Moisture-curing polyurethane systems (e.g. DE 196 46 879), apart from the NCO component, do not require any further reactants. However, they have the disadvantage that the curing takes a comparatively long time (1-4 weeks according to temperature and air humidity) and depends significantly on ambient parameters.

It was therefore an object of the present invention to find reactive compositions containing isocyanate groups, which can be cured without addition of reactants, but at least without addition of stoichiometric amounts of reactants.

It has been found that, surprisingly, the inventive compositions fulfil the objective. The present invention provides reactive compositions with isocyanate groups, comprising
A) at least one compound with isocyanate groups, based on aromatic, aliphatic, (cyclo)aliphatic or cycloaliphatic diisocyanates and/or polyisocyanates, some of whose NCO groups may have been reacted with compounds having hydroxyl groups and/or amine groups, in a proportion by weight, based on the overall formulation, of 10 to 99.8%,
B) at least one quaternary ammonium salt and/or phosphonium salt with halogens or organic or inorganic acid anions or hydroxide as a counterion as a catalyst, in a proportion by weight, based on the overall formulation, of 0.1 to 3%,
C) at least one compound bearing epoxy groups as a cocatalyst, in a proportion by weight, based on the overall formulation, of 0.1 to 5%,
D) optionally at least one acid in monomeric or polymeric form, in a proportion by weight, based on the overall formulation, of 0.01 to 20%,
E) optionally compounds containing hydroxyl groups, in a proportion by weight, based on the overall formulation, of 0.5 to 70%,
F) optionally assistants and additives, in a proportion by weight, based on the overall formulation, of 0.001 to 50%,
G) optionally solvents, in a proportion by weight, based on the overall formulation, of 1 to 70%.

The invention also provides a process for preparing the inventive compositions.

The inventive compositions are reactive. This means that the compositions cure at 80 to 160° C. within 5 to 30 minutes.

Suitable compounds with isocyanate groups, component A), are in principle a wide range of isocyanates based on aromatic, aliphatic, (cyclo)aliphatic or cycloaliphatic diisocyanates and/or polyisocyanates. According to the invention, diisocyanates, for example isophorone diisocyanate (IPDI), hexamethylene diisocyanate (HDI), dicyclohexylmethane 2,2'-diisocyanate/dicyclohexylmethane 2,4'-diisocyanate/dicyclohexylmethane 4,4'-diisocyanate ($H_{12}$MDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), diphenylmethylene diisocyanate (MDI), toluidine diisocyanate (TDI) and tetramethylxylylene diisocyanate (TMXDI), are used as compounds A) with isocyanate groups. Very particular preference is given to using IPDI, 4,4'-$H_{12}$MDI and HDI. Of course, it is also possible to use mixtures. These compounds with isocyanate groups are used either in pure form or in the form of derivatives thereof, for example isocyanurates, allophanates, ureas, biurets and/or carbodiimides, in a proportion by weight, based on the overall formulation, of 10 to 99.8%. The pure or derivatized isocyanates can be reacted with compounds bearing hydroxyl groups or amine groups, so as to result in prepolymers with isocyanate groups as component A).

The conversion of these isocyanates bearing isocyanate groups to prepolymers with isocyanate groups, component A), includes the reaction of the free NCO groups with monomers or polymers containing hydroxyl groups and/or containing amine groups, for example polyesters, polythioethers, polyethers, polycaprolactams, polyepoxides, polyesteramides, polyamides, polyetheramines, polyurethanes or low molecular weight di-, tri- and/or tetraalcohols as chain extenders, and optionally monoamines and/or monoalcohols as chain terminators, and has been described frequently before (DE 198 51 182, DE 197 00 014, WO 98/34972, WO 97/466 093, EP 669 353, EP 669 354). For this purpose, noninventive catalysts, for example DBTL, are used.

The excess content of monomeric isocyanates can be removed from the prepolymer mixture A) optionally by distillation, for example by a short-path or thin-film distillation.

The NCO content of the prepolymer A) may vary between 1 and 45%, where the ratio of NCO/OH groups is >1.

Preference is given to using polyesters with an OH number of 30 to 250 mg KOH/g and a mean molecular weight of 250 to 6000 g/mol, or monomeric dialcohols, for example ethylene glycol, propane-1,2- and -1,3-diol, 2,2-dimethylpropane- 1,3-diol, butane-1,4-diol, hexane-1,6-diol, 2-methylpentane-1,5-diol, 2,2,4-trimethylhexane-1,6-diol, 2,4,4-trimethylhexane-1,6-diol, heptane-1,7-diol, dodecane-1,12-diol, octadec-9,10-ene-1,12-diol, thiodiglycol, octadecane-1,18-diol, 2,4-dimethyl-2-propylheptane-1,3-diol, diethylene glycol, triethylene glycol, tetraethylene glycol, trans- and cis-1,4-cyclohexanedimethanol.

The catalysts used from B) are quaternary ammonium salts and/or quaternary phosphonium salts with halogens or organic or inorganic acid anions as the counterion. Examples thereof are tetramethylammonium formate, tetramethylammonium acetate, tetramethylammonium propionate, tetramethylammonium butyrate, tetramethylammonium benzoate, tetramethylammonium hydroxide, tetraethylammonium formate, tetraethylammonium acetate, tetraethylammonium propionate, tetraethylammonium butyrate, tetraethylammonium benzoate, tetraethylammonium hydroxide, tetrapropylammonium formate, tetrapropylammonium acetate, tetrapropylammonium propionate, tetrapropylammonium butyrate, tetrapropylammonium benzoate, tetrapropylammonium hydroxide, tetrabutylammonium formate, tetrabutylammonium acetate, tetrabutylammonium propionate, tetrabutylammonium butyrate, tetrabutylammonium benzoate, tetrabutylammonium hydroxide, tetrabutylphosphonium acetate, tetrabutylphosphonium formate, ethyltriphenylphosphonium acetate, tetrabutylphosphonium benzotriazolate, tetraphenylphosphonium phenoxide, trihexyltetradecylphosphonium decanoate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutylphosphonium fluoride, tetrabutylammonium chloride, tetrabutylammonium bromide, tetrabutylammonium iodide, tetraethylammonium chloride, tetraethylammonium bromide, tetraethylammonium iodide, tetramethylammonium chloride, tetramethylammonium bromide, tetramethylammonium iodide, benzyltrimethylammonium chloride, benzyltriethylammonium chloride, benzyltripropylammonium chloride, benzyltributylammonium chloride, methyltributylammonium chloride, methyltripropylammonium chloride, methyltriethylammonium chloride, methyltriphenylammonium chloride, phenyltrimethylammonium chloride, benzyltrimethylammonium bromide, benzyltriethylammonium bromide, benzyltripropylammonium bromide, benzyltributylammonium bromide, methyltributylammonium bromide, methyltripropylammonium bromide, methyltriethylammonium bromide, methyltriphenylammonium bromide, phenyltrimethylammonium bromide, benzyltrimethylammonium iodide, benzyltriethylammonium iodide, benzyltripropylammonium iodide, benzyltributylammonium iodide, methyltributylammonium iodide, methyltripropylammonium iodide, methyltriethylammonium iodide, methyltriphenylammonium iodide, phenyltrimethylammonium iodide, tetramethylammonium fluoride, tetraethylammonium fluoride, tetrabutylammonium fluoride, tetraoctylammonium fluoride and benzyltrimethylammonium fluoride. These catalysts can be added alone or in mixtures. They may also be encapsulated or attached in polymeric form. Preference is given to using tetraethylammonium benzoate and tetrabutylammonium hydroxide.

The proportion of catalysts B) may be 0.1 to 3% by weight of the overall formulation, preferably from 0.3 to 2% by weight of the overall formulation.

The cocatalysts C) used are epoxides. Useful examples include glycidyl ethers and glycidyl esters, aliphatic epoxides, diglycidyl ethers based on bisphenol A and glycidyl methacrylates. Examples of such epoxides are triglycidyl isocyanurate (TGIC, trade name Araldit 810, Huntsman), mixtures of diglycidyl terephthalate and triglycidyl trimelitate (trade name Araldit PT 910 and 912, Huntsman), glycidyl esters of Versatic acid (trade name Kardura E10, Shell), 3,4-epoxycyclohexylmethyl 3',4'-epoxycyclohexanecarboxylate (ECC), diglycidyl ethers based on bisphenol A (trade name EPIKOTE 828, Shell), ethylhexyl glycidyl ether, butyl glycidyl ether, pentaerythrityl tetraglycidyl ether, (trade name Polypox R16, UPPC AG) and other Polypox types with free epoxy groups. Preference is given to using Araldit PT 910 and/or 912. The proportion of catalysts C) may be 0.1 to 5% by weight, preferably 0.3 to 2% by weight, in the overall formulation, and they may be present alone or in mixtures.

Acids specified under D) are all substances, solid or liquid, organic or inorganic, monomeric or polymeric, which possess the properties of a Brønsted acid or of a Lewis acid. Examples include: sulphuric acid, acetic acid, benzoic acid, malonic acid, succinic acid, terephthalic acid, but also copolyesters or copolyamides with an acid number of at least 20. If present, the proportion of these acids in the overall formulation may be between 0.01% and 20% by weight, preferably between 0.1 and 5% by weight, and they may be present alone or in mixtures.

The compounds E) containing hydroxyl groups used are, for example, polymers with an OH number of 20-500 mg KOH/gram, preferably 30 to 120 mg KOH/g. Among the polymers E) containing hydroxyl groups, preference is given to using polyesters, polyethers, polyacrylates, polyurethanes, polyethers and/or polycarbonates with an OH number of 20 to 500 (in mg KOH/gram) and a mean molar mass of 250 to 6000 g/mol. Particular preference is given to using polyesters which contain hydroxyl groups and have an OH number of 20 to 150 and a mean molecular weight of 500 to 6000 g/mol. It will be appreciated that it is also possible to use mixtures of such polymers.

The polymers E) used are more preferably polyesters containing hydroxyl groups. The carboxylic acids preferred for the preparation of these polyesters may be aliphatic, cycloaliphatic, aromatic and/or heterocyclic in nature and may optionally be substituted by halogen atoms and/or unsaturated. Examples thereof include: succinic acid, adipic acid, suberic acid, azelaic acid, sebacic acid, phthalic acid, terephthalic acid, isophthalic acid, trimellitic acid, pyromellitic acid, tetrahydrophthalic acid, hexahydrophthalic acid, hexahydroterephthalic acid, di- and tetrachlorophthalic acid, endomethylenetetrahydrophthalic acid, glutaric acid, maleic acid and fumaric acid and—where available—the anhydrides thereof, dimethyl terephthalate, bisglycol terephthalate, and also cyclic monocarboxylic acids such as benzoic acid, p-tert-butylbenzoic acid or hexahydrobenzoic acid.

Useful polyhydric alcohols for preparing the polyester e) include, for example, ethylene glycol, propylene 1,2- and 1,3-glycol, butylene 1,4- and 2,3-glycol, di-β-hydroxyethylbutanediol, 1,6-hexanediol, 1,8-octanediol, neopentyl glycol, cyclohexanediol, bis(1,4-hydroxymethyl)propane, 2-methyl-1,3-propanediol, 2-methylpentane-1,5-diol, 2,2,4 (2,4,4)-trimethylhexane-1,6-diol, glycerol, trimethylolpropane, trimethylolethane, hexane-1,2,6-triol, butane-1,2,4-triol, tris(β-hydroxyethyl)isocyanurate, pentaerythritol, mannitol and sorbitol, and also diethylene glycol, triethylene glycol, tetraethylene glycol, dipropylene glycol, polypropylene glycol, polybutylene glycol, xylylene glycol and neopentyl glycol hydroxypivalate.

It is also possible to use mono- and polyesters of lactones, e.g. ε-caprolactone or hydroxycarboxylic acids, e.g. hydroxypivalic acid, ε-hydroxydecanoic acid, ε-hydroxycaproic acid, thioglycolic acid, as starting materials for the preparation of the polymers E. Polyesters formed from the abovementioned polycarboxylic acids and derivatives thereof and polyphenols such as hydroquinone, bisphenol A, 4,4'-dihydroxybiphenyl or bis(4-hydroxyphenyl) sulphone; polyesters of carbonic acid which are obtainable from hydroquinone, diphenylolpropane, p-xylylene glycol, ethylene glycol, butanediol or hexane-1,6-diol and other polyols by customary condensation reactions, for example with phosgene or diethyl or diphenyl carbonate, or from cyclic carbonates such as glycol carbonate or vinylidene carbonate, by polymerization in a known manner; polyesters of silicic acid, polyesters of phosphoric acid, for example of methane-, ethane-, β-chloroethane-, benzene- or styrene-phosphoric acid, -phosphoryl chloride or -phosphoric esters, and polyalcohols or polyphenols of the abovementioned type; polyesters of boric acid; polysiloxanes, for example the products obtainable by hydrolysis of dialkyldichlorosilanes with water and subsequent treatment with polyalcohols, and those obtainable by addition of polysiloxane dihydrides onto olefins such as allyl alcohol or acrylic acid, are suitable as starting materials for the preparation of the polymer E).

Preferred polyesters E) are, for example, also the reaction products of polycarboxylic acids and glycidyl compounds, as described, for example, in DE-A 24 10 513.

Examples of glycidyl compounds which can be used are esters of 2,3-epoxy-1-propanol with monobasic acids which have 4 to 18 carbon atoms, such as glycidyl palmitate, glycidyl laurate and glycidyl stearate, alkylene oxides having 4 to 18 carbon atoms, such as butylene oxide, and glycidyl ethers such as octyl glycidyl ether.

The polyesters E) can be obtained in a manner known per se by condensation in an inert gas atmosphere at temperatures of 100 to 260° C., preferably 130 to 220° C., in the melt or in azeotropic mode, as described, for example, in Methoden der Organischen Chemie [Methods of Organic Chemistry] (Houben-Weyl); volume 14/2, pages 1 to 5, 21 to 23, 40 to 44, Georg Thieme Verlag, Stuttgart, 1963, or in C. R. Martens, Alkyd Resins, pages 51 to 59, Reinhold Plastics Appl. Series, Reinhold Publishing Comp., New York, 1961.

Useful polymers E) also include hydroxy-functional polyethers and polycarbonates. Preferred polyethers can be prepared, for example, by polyaddition of epoxides, such as ethylene oxide, propylene oxide, butylene oxide, trimethylene oxide, 3,3-bis(chloromethyl)oxabicyclobutane, tetrahydrofuran, styrene oxide or the bis-2,5-epoxypropyl ether of diphenylolpropane, by cationic polymerization in the presence of Lewis acids, for example boron trifluoride, or by anionic polymerization with alkali metal hydroxides or alkali metal alkoxides, or by addition of these epoxides, if appropriate in a mixture or successively, onto starter components with reactive hydrogen atoms, such as alcohols or amines, for example water, ethylene glycol, polypropylene 1,3- or 1,2-glycol, pentamethylene glycol, hexanediol, decamethylene glycol, trimethylolpropane, glycerol, aniline, ammonia, ethanolamine, ethylenediamine, di(β-hydroxypropyl)methylamine and hydroxy alkylated phenols, for example di(β-hydroxyethoxy)resorcinol.

As is well known, polymers E) which have carbonate groups mentioned by way of example can be obtained by reacting the dihydric or trihydric alcohols of the molecular weight range from 62 to 300 mentioned by way of example with diaryl carbonates, for example diphenyl carbonate, phosgene, or preferably cyclic carbonates, for example trimethylene carbonate or 2,2-dimethyltrimethylene carbonate (NPC), or mixtures of such cyclic carbonates. Particularly preferred carbonatediols are those which can be prepared from the dihydric alcohols mentioned as starter molecules and NPC with ring opening.

Suitable polymers E) are also, for example, the following polymers which are known per se in polyurethane chemistry: polythioethers, polyacetals, polyepoxides, polyesteramides or polyurethanes of the molecular weight range from 250 to 8500 g/mol, which have hydroxyl groups reactive toward isocyanate groups.

It will be appreciated that it is also possible to use mixtures of the aforementioned polymers E).

Suitable monomeric alcohols E) are mono-, di- or polyols of molecular weight at least 32.

For example, the monoalcohols are methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols and hydroxymethylcyclohexane.

The diols are, for example, ethylene glycol, triethylene glycol, butane-1,4-diol, pentane-1,5-diol, hexane-1,6-diol, 3-methylpentane-1,5-diol, neopentyl glycol, 2,2,4(2,4,4)-trimethylhexanediol, and neopentyl glycol hydroxypivalate.

The triols are, for example, trimethylolpropane, ditrimethylolpropane, trimethylolethane, hexane-1,2,6-triol, butane-1,2,4-triol, tris(β-hydroxyethyl) isocyanurate, pentaerythritol, mannitol or sorbitol.

For all components E) containing hydroxyl groups, the equivalents ratio of A) to E), i.e. the ratio of NCO/OH groups, is >1, preferably NCO/OH>1.5, if E) is present.

For the compositions, it is possible to add assistants and additives F) such as levelling agents, for example polysilicones or acrylates, light stabilizers, for example sterically hindered amines, or other assistants as described, for example, in EP 669 353, in a total amount of 0.05 to 5% by weight. Fillers and pigments, for example titanium dioxide, can be added in an amount of up to 50% by weight of the overall composition.

Optionally, additional catalysts as already known in polyurethane chemistry may be present. These are principally organometallic catalysts, for example dibutyltin dilaurate, or else tertiary amines, for example 1,4-diazabicyclo[2.2.2]octane, in amounts of 0.001-1% by weight.

Useful solvents G) include all liquid organic and inorganic liquids which are inert under the reaction conditions. Examples include acetone, ethyl acetate, butyl acetate, xylene, Solvesso 100, Solvesso 150, methoxypropyl acetate and dibasic esters.

The invention also provides a process for preparing reactive compositions with isocyanate groups by homogenizing at upper temperature limits of 120 to 130° C.

The homogenization of all constituents to prepare the inventive composition can be effected in suitable equipment, for example heatable stirred tanks, kneaders or else extruders, though upper temperature limits of 120 to 130° C. should not be exceeded. In the case of the solid formulations, ready-to-spray powders can be applied to suitable substrates by the known processes, for example by electrostatic powder spraying, fluidized bed sintering or electrostatic fluidized bed sintering. After the application, the coated workpieces are cured by heating to a temperature of 60 to 220° C. for 4 to 60 minutes, preferably at 80 to 160° C. for 6 to 30 minutes.

The present invention further provides for the use of the inventive reactive compositions with isocyanate groups as a coating material, especially as a primer, intermediate layer, topcoat, clearcoat, adhesive or sealant material, and also the coating compositions themselves.

The invention also provides for the use of the inventive reactive compositions with isocyanate groups for producing liquid and pulverulent coatings on metal, plastic, glass, wood, textile, MDF (medium density fibreboard) or leather substrates, or other heat-resistant substrates.

The invention also provides for the use of the inventive reactive compositions with isocyanate groups as adhesive compositions for adhesive bonds of metal, plastic, glass, wood, textile, MDF (medium density fibreboard) or leather substrates, or other heat-resistant substrates.

The invention likewise provides meal coating compositions, especially for automobile bodies, motorcycles and bicycles, building parts and domestic appliances, wood coating compositions, glass coating compositions, textile coating compositions, leather coating compositions and plastics coating compositions, which comprise the inventive reactive compositions with isocyanate groups.

The coating can either be used alone, or may be a layer of a multilayer structure. It can be applied, for example, as a primer, as an intermediate layer or as a topcoat or clearcoat. The layers above or below the coating may either be cured by conventional thermal means or else by means of radiation.

The subject-matter of the invention will be illustrated in detail hereinafter with reference to examples.

EXAMPLES

I. Feedstocks

TABLE 1

| Feedstocks | Product description, manufacturer |
|---|---|
| N3300 | Isocyanurate of hexamethylene diisocyanate, Bayer AG component A) |
| DYNACOLL 7150 | Polyester, Evonik Degussa GmbH, Coatings & Colorants, OH number: 50 mg KOH/g, $T_G$: 42° C., component A) |
| TEAB | Tetraethylammonium benzoate, RSA Corp., component B) |
| ARALDIT PT 912 | Epoxide, Huntsman, acid scavenger, component D) |
| IPDI | Isophorone diisocyanate, Evonik Degussa GmbH, Coatings & Colorants, component A) |
| DBTL | Dibutyltin dilaurate, catalyst, Aldrich |

$T_G$: glass transition point;

II. Preparation of the NCO-Prepolymer

The OH polyester DYNACOLL 7150 (191 g) was dissolved in 150 ml of a mixture of butyl acetate (BA) and xylene (1:1), and admixed with 0.02 g of DBTL. This mixture was added dropwise to 31.7 g of IPDI at 80° C. within 30 min. The mixture was left to stir at this temperature for another 1.5 hours and then cooled. The NCO content was then 1.6%.

III. Inventive Composition 1 and Comparative 2* and 4*

TABLE 2

| Experiment | 1 | 2* | 3 | 4* |
|---|---|---|---|---|
| N3300 | | | 98% | 100% |
| Prepolymer A (60% in xylene/BA) | 98% | 100% | | |
| TEAB, component B) | 1% | — | 1% | |
| ARALDIT PT 912, component C) | 1% | — | 1% | |

*noninventive comparative examples; percent by weight

IV. Results

All formulation constituents are combined and stirred by means of a magnetic stirrer for 20 min.

The ready-to-use formulation is applied to steel sheets (Bonder Bleche 1303) by knife-coating in a layer thickness of 20-25 μm and cured in a forced-air oven at 150° C. (30 min).

TABLE 3

| Curing at 150° C./30 min | 1 | 2* | 3 | 4* |
|---|---|---|---|---|
| Erichsen cupping [mm] | 10.0 | <0.5 | 6 | not measurable |
| Ball impact (dir./rev.) [inch × lbs] | >80/>80 | <10/<10 | >80/>80 | not measurable |
| Cured | yes | no | yes | no, sample liquid |

*noninventive comparative examples
Erichsen cupping to DIN 53156, ball impact to ASTM D 2794-93

The invention claimed is:

1. A reactive composition, comprising
   A) 10 to 99.8% by weight of a compound or mixture of compounds each comprising at least two reactive isocyanate groups in unblocked form;
   B) 0.1 to 3% by weight of at least one of a quaternary ammonium salt and a quaternary phosphonium salt comprising counterion, an anion selected from the group consisting of hydroxide, a halide, an anion of an organic acid, and an anion of an inorganic acid; and
   C) 0.1 to 5% by weight of a compound comprising an epoxy group wherein
   the compound comprising at least two reactive isocyanate groups is selected from the group consisting of:
   a) an aromatic, aliphatic or cycloaliphatic diisocyanate in pure form;
   b) an aromatic, aliphatic or cycloaliphatic polyisocyanate in pure form;
   c) an aromatic, aliphatic or cycloaliphatic diisocyanate in a form of a derivative selected from the group consisting of an isocyanurate, an allophanate, a urea, a biuret and a carbodiimide;
   d) an aromatic, aliphatic or cycloaliphatic polyisocyanate in a form of a derivative selected from the group consisting of an isocyanurate, an allophanate, a urea, a biuret and a carbodiimide; and
   a prepolymer obtained by reaction of any of a) to d) with a compound having at least two isocyanate reactive hydroxyl groups, amine groups or combination thereof,
   wherein the reactive composition does not include an external blocking agent, and
   wherein the reactive composition is curable at a temperature of from 60° C. to less than 120° C.

2. The reactive composition according to claim 1, further comprising at least one of the following components:
   D) at least one acid in monomeric or polymeric form, in a proportion by weight, based on the overall formulation, of 0.01 to 20%,
   E) a compound comprising a hydroxyl group, in a proportion by weight, based on the overall formulation, of 0.5 to 70%,
   F) an assistant and/or an additive, in a proportion by weight, based on the overall formulation, of 0.001 to 50%,
   G) a solvent, in a proportion by weight, based on the overall formulation, of 1 to 70%.

3. The reactive composition according to claim 1,
wherein the at least one compound comprising at least two isocyanate groups is selected from the group consisting of isophorone diisocyanate (IPDI), hexamethylene diisocyanate (HDI), dicyclohexylmethane 2,2'-diisocyanate/dicyclohexylmethane 2,4'-diisocyanate/dicyclohexylmethane 4,4'-diisocyanate ($H_{12}$MDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), diphenylmethylene diisocyanate (MDI), toluidine diisocyanate (TDI) and tetramethylxylylene diisocyanate (TMXDI).

4. The reactive composition according to claim 3,
wherein the at least one compound comprising at least two isocyanate groups comprises one selected from the group consisting of IPDI, 4,4'$H_{12}$MDI and HDI.

5. The reactive composition according to claim 1,
wherein the at least one compound comprising at least two isocyanate groups is reacted with at least one of a monomer and a polymer comprising a hydroxyl group or an amine group to produce a prepolymer A) comprising at least two isocyanate groups, where a ratio of NCO/OH groups is greater than 1.

6. The reactive composition according to claim 5, which comprises a polymer reacted with the compound comprising at least two isocyanate groups,
wherein the polymer is selected from the group consisting of polyester polythioether, polyether, polycaprolactam, polyepoxide, polyesteramide, polyamide, polyetheramine, and polyurethane.

7. The reactive composition according to claim 6,
wherein the polymer is a polyester with an OH number of 30 to 250 mg KOH/g and a mean molecular weight of 250 to 6000 g/mol.

8. The reactive composition according to claim 5, which comprises a monomer reacted with the compound comprising at least two isocyanate groups, wherein the monomer is selected from the group consisting of a monoalcohol, a dialcohol, a trialcohol, a tetraalcohol, and a monoamine.

9. The reactive composition according to claim 8,
wherein the monomer comprises one selected from the group consisting of ethylene glycol, propane-1,2- and -1,3-diol, 2,2-dimethylpropane-1,3-diol, butane-1,4-diol, hexane-1,6-diol, 2-methylpentane-1,5-diol, 2,2,4-trimethylhexane-1,6-diol, 2,4,4-trimethylhexane-1,6-diol, heptane-1,7-diol, dodecane-1,12-diol, octadec-9,10-ene-1,12-diol, thiodiglycol, octadecane-1,18-diol, 2,4-dimethyl-2-propylheptane-1,3-diol, diethylene glycol, triethylene glycol, tetraethylene glycol, trans- and cis-1,4-cyclohexanedimethanol.

10. The reactive composition according to claim 1, wherein component B) is at least one selected from the group consisting of tetramethylammonium formate, tetramethylammonium acetate, tetramethylammonium propionate, tetramethylammonium butyrate, tetramethylammonium benzoate, tetramethylammonium hydroxide, tetraethylammonium formate, tetraethylammonium acetate, tetraethylammonium propionate, tetraethylammonium butyrate, tetraethylammonium benzoate, tetraethylammonium hydroxide, tetrapropylammonium formate, tetrapropylammonium acetate, tetrapropylammonium propionate, tetrapropylammonium butyrate, tetrapropylammonium benzoate, tetrapropylammonium hydroxide, tetrabutylammonium formate, tetrabutylammonium acetate, tetrabutylammonium propionate, tetrabutylammonium butyrate, tetrabutylammonium benzoate, tetrabutylammonium hydroxide, tetrabutylphosphonium acetate, tetrabutylphosphonium formate, ethyltriphenylphosphonium acetate, tetrabutylphosphonium benzotriazolate, tetraphenylphosphonium phenoxide, trihexyltetradecylphosphonium decanoate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutylphosphonium fluoride, tetrabutylammonium chloride, tetrabutylammonium bromide, tetrabutylammonium iodide, tetraethylammonium chloride, tetraethylammonium bromide, tetraethylammonium iodide, tetramethylammonium chloride, tetramethylammonium bromide, tetramethylammonium iodide, benzyltrimethylammonium chloride, benzyltriethylammonium chloride, benzyltripropylammonium chloride, benzyltributylammonium chloride, methyltributylammonium chloride, methyltripropylammonium chloride, methyltriethylammonium chloride, methyltriphenylammonium chloride, phenyltrimethylammonium chloride, benzyltrimethylammonium bromide, benzyltriethylammonium bromide, benzyltripropylammonium bromide, benzyltributylammonium bromide, methyltributylammonium bromide, methyltripropylammonium bromide, methyltriethylammonium bromide, methyltriphenylammonium bromide, phenyltrimethylammonium bromide, benzyltrimethylammonium iodide, benzyltriethylammonium iodide, benzyltripropylammonium iodide, benzyltributylammonium iodide, methyltributylammonium iodide, methyltripropylammonium iodide, methyltriethylammonium iodide, methyltriphenylammonium iodide, phenyltrimethylammonium iodide, tetramethylammonium fluoride, tetraethylammonium fluoride, tetrabutylammonium fluoride, tetraoctylammonium fluoride and benzyltrimethylammonium fluoride.

11. The reactive composition according to claim 10,
wherein the catalyst comprises tetraethylammonium benzoate, tetrabutylammonium hydroxide or a mixture thereof.

12. The reactive composition according to claim 1, wherein the component C) comprises one selected from the group consisting of a glycidyl ether, a glycidyl ester, an aliphatic epoxide, a diglycidyl ether based on bisphenol A and a glycidyl methacrylate.

13. The reactive composition according to claim 12,
wherein component C is at least one selected from the group consisting of triglycidyl isocyanurate, mixtures of diglycidyl terephthalate and triglycidyl trimellitate, glycidyl esters of Versatic acid, 3,4-epoxycyclohexylmethyl 3',4'-epoxycyclohexanecarboxylate (ECC), diglycidyl ethers based on bisphenol A, ethylhexyl glycidyl ether, butyl glycidyl ether, pentaerythrityl tetraglycidyl ether.

14. The reactive composition according to claim 12, which comprises at least one acid in monomeric or polymeric form,
wherein the at least one acid in monomeric or polymeric form comprises one selected from the group consisting of sulphuric acid, acetic acid, benzoic acid, malonic acid, terephthalic acid, phthalic acid, and a copolyester copolyesters or a copolyamide with an acid number of at least 20.

15. The reactive composition according to claim 2, which comprises a compound comprising a hydroxyl group, wherein the compound comprising a hydroxyl group comprises polyester, polyether, polyacrylate, polyurethane, polyether and/or polycarbonate with an OH number of 20 to 500 mg KOH/gram and a mean molar mass of 250 to 6000 g/mol, and mixtures thereof.

16. The reactive composition according to claim 2, which comprises at least one assistant or additive, wherein the assistant or additive is a polyester which comprises hydroxyl groups and have an OH number of 20 to 150 and a mean molecular weight of 500 to 6000 g/mol.

17. The reactive composition according to claim 2, wherein the compound comprising a hydroxyl group is a reaction product of polycarboxylic acid and a glycidyl compound.

18. The reactive composition according to claim 2, wherein the compound comprising a hydroxyl group reactive toward an isocyanate is selected from the group consisting of a polythioether, a polyacetal, a polyepoxide, a polyesteramide and a polyurethane, wherein a molecular weight range of the compound is from 250 to 8500 g/mol eof, which have a hydroxyl group reactive toward an isocyanate group.

19. The reactive composition according to claim 2, wherein the compound comprising a hydroxyl group is monoalcohol, diol or polyol of molecular weight at least 32 g/mol.

20. The reactive composition according to claim 2, wherein an equivalents ratio of A) to E), i.e. the ratio of NCO/OH groups, is greater than 1.

21. A process for preparing a reactive composition, comprising homogenizing at upper temperature limits of 120 to 130° C.;
   A) 10 to 99.8% by weight of a compound or mixture of compounds each comprising at least two reactive isocyanate groups;
   B) 0.1 to 3% by weight of at least one of a quaternary ammonium salt and a quaternary phosphonium salt comprising as a counterion, an anion selected from the group consisting of hydroxide, a halide, an anion of an organic acid, and an anion of an inorganic acid; and
   C) 0.1 to 5% by weight of a compound comprising an epoxy group wherein
   the compound comprising at least two reactive isocyanate groups is selected from the group consisting of:
   a) an aromatic, aliphatic or cycloaliphatic diisocyanate in pure form;
   b) an aromatic, aliphatic or cycloaliphatic polyisocyanate in pure form;
   c) an aromatic, aliphatic or cycloaliphatic diisocyanate in a form of a derivative selected from the group consisting of an isocyanurate, an allophanate, a urea, a biuret and a carbodiimide;
   d) an aromatic, aliphatic or cycloaliphatic polyisocyanate in a form of a derivative selected from the group consisting of an isocyanurate, an allophanate, a urea, a biuret and a carbodiimide; and
   a prepolymer obtained by reaction of any of a) to d) with a compound having at least two isocyanate reactive hydroxyl groups, amine groups or combination thereof,
   wherein the reactive composition does not include an external blocking agent, and
   wherein the reactive composition is curable at a temperature of from 60° C. to less than 120° C.

22. A coating material comprising the reactive composition according to claim 1.

23. A metal having at least one surface coated with the coating composition according to claim 1.

24. A wood surface coated with the coating composition according to claim 1.

25. A leather or textile substrate coated with the coating composition according to claim 1.

26. A plastics or glass substrate coated with the coating composition according to claim 1.

27. The coated metal according to claim 23 wherein the metal is part of one selected from the group consisting of an automobile body, a motorcycle, a bicycle, a building part and a domestic appliance.

28. The coated metal according to claim 23, wherein the coating composition further comprises
   at least one of
   D) at least one acid in monomeric or polymeric form, in a proportion by weight, based on the overall formulation, of 0.01 to 20%,
   E) a compound comprising a hydroxyl group, in a proportion by weight, based on the overall formulation, of 0.5 to 70%,
   F) an assistant and/or an additive, in a proportion by weight, based on the overall formulation, of 0.001 to 50%,
   G) a solvent, in a proportion by weight, based on the overall formulation, of 1 to 70%.

* * * * *